(No Model.)
A. TOMLINSON.
LOOM TEMPLE.
No. 504,288. Patented Aug. 29, 1893.
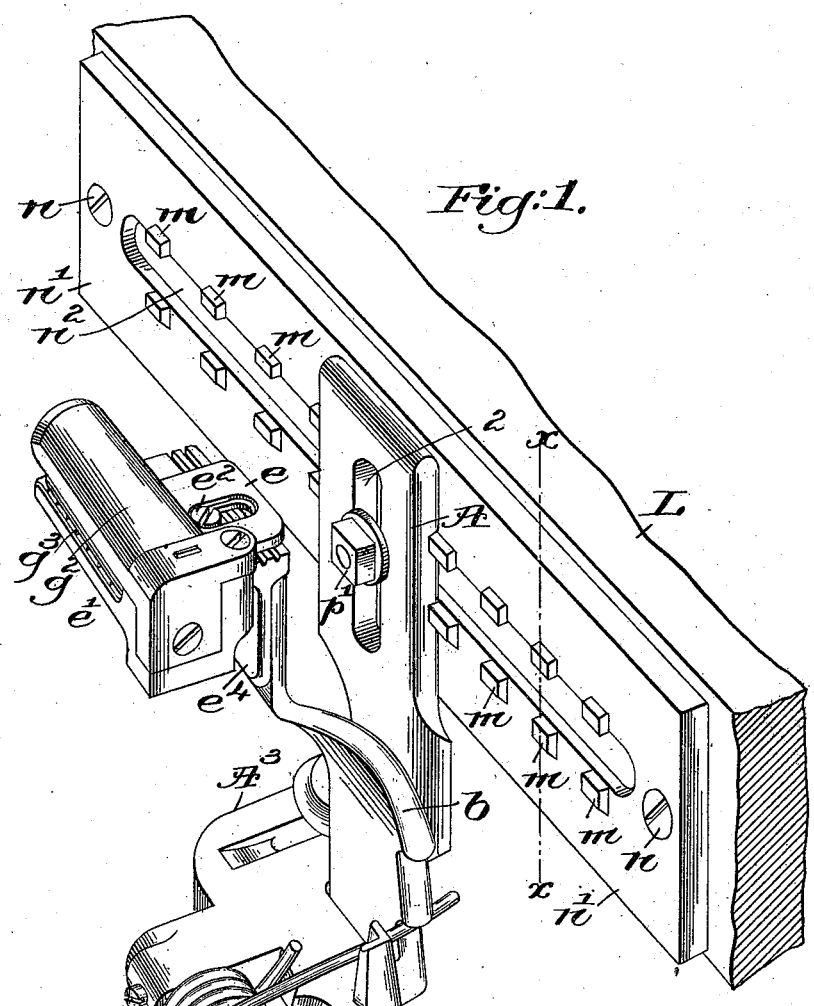
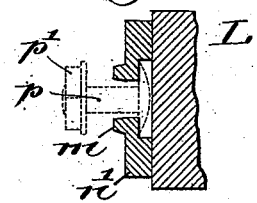
Witnesses.
Fred S. Greenleaf.
Louis N. Gowell.
Inventor:
Ambrose Tomlinson
by Crosby & Gregory attys.

UNITED STATES PATENT OFFICE.

AMBROSE TOMLINSON, OF SOUTH LAWRENCE, ASSIGNOR TO THE DUTCHER TEMPLE COMPANY, OF HOPEDALE, MASSACHUSETTS.

LOOM-TEMPLE.

SPECIFICATION forming part of Letters Patent No. 504,288, dated August 29, 1893.

Application filed June 2, 1893. Serial No. 476,330. (No model.)

*To all whom it may concern:*

Be it known that I, AMBROSE TOMLINSON, of South Lawrence, county of Essex, State of Massachusetts, have invented an Improvement in Loom-Temples, of which the following description, in connection with the accompanying drawings, is a specification, like letters and figures on the drawings representing like parts.

This invention has for its object to improve the devices for supporting and adjusting a loom temple on the breast-beam, my invention being shown as embodied in connection with a hinged temple substantially such as shown in United States Patent No. 456,916.

In practice when the temple has to be adjusted to adapt it to change in the width of the goods being woven on the loom, or to adapt the temple to slight changes in position of the reed necessitated by the substitution of a new warp-beam, such changes if but slight, say about an inch, are effected by changing the position of the temple head on the usual corrugated plate attached to the pivoted arm carrying the temple head. The stand of the temple has been bolted to a metal plate having two short horizontal slots one of which is entered by a bolt to confine the plate to the breast-beam, the other slot being entered by a guiding stud. In this latter plan change of position of more than an inch, and under about three inches, may be effected by loosening the bolt which connects the plate to the inner side of the breast beam, and then the plate may be slid along on the breast beam taking the stand with it, but if the adjustment is over three inches, then the bolt and guide stud have to be removed and new holes bored for them in the breast-beam, and the plate may then be given a new position. When the entire plate is moved, as has to be done at times, considerable care has to be exercised to secure the plate in horizontal position to thus preserve the proper relation horizontally of the pod of the temple with relation to the race of the lay, so that the pod will not be struck by the lay, such adjustment requiring considerable time.

In accordance with my invention I have produced a peculiar plate which obviates the necessity of removing the plate from the breast-beam.

In accordance with my invention I have provided a breast beam plate having a long longitudinal slot for a bolt, and a series of aligning stops to co-operate with the temple stand, the said bolt connecting the stand and plate, and in case of excessive lateral adjustments the nut on said bolt has only to be loosened, and the bolt and stand may be shoved laterally along the plate to co-operate with another set of aligning stops, any fine lateral adjustments under an inch being preferably effected by adjusting the temple head on the movable arm or carrier. In my invention the stops referred to prevent any possible tipping sidewise of the stand carrying the temple.

Figure 1 in perspective shows part of a breast-beam of a loom with a plate attached thereto embodying my invention, together with a stand and temple, and Fig. 2 is a section in the line $x$, Fig. 1.

The slotted stand $A$ having a foot $A^3$ for the reception of a stud $C$ used to hinge the arm $b$ to the said foot, the attached head composed essentially of pod $e'$ and cap $g^2$ inclosing a suitable roll $g^3$, the screw $e^2$ to confine the ear $e$ of the cap to the serrated plate $e^4$ secured to the upper end of the arm $b$, and the spring $b'$, are and may be all substantially as in said patent so need not be herein further described.

To the breast-beam L I have attached by suitable screws $n$ a metallic plate $n'$ having a long slot $n^2$. Along or near this slot the plate is provided with a series of aligning stops $m$ to co-operate with the shank of the stand, the stand being held where left, by a bolt or adjusting device $p$, extended through it and the slot in the plate, the head of the bolt, see Fig. 2, entering a space between said plate and breast-beam, and, as herein shown, one set of stops enters the slot 2 in the stand $A$, while other sets meet the sides of the stand, thus keeping it in proper alignment.

To adjust the temple further than permitted by usual adjustments at the head, the operator will loosen the nut $p'$ on the bolt and will slide the stand and bolt for the distance of one or more stops, and then fasten the stand in place by turning the nut onto the bolt.

Having described my invention, what I claim, and desire to secure by Letters Patent, is—

The combination with a loom temple and its stand, of a slotted plate having a series of aligning stops, and a suitable bolt to confine the stand in adjusted position, substantially as described.

In testimony whereof I have signed my name to this specification in the presence of two subscribing witnesses.

AMBROSE TOMLINSON.

Witnesses:
GEO. W. GREGORY,
HARRY TOMLINSON.